(12) United States Patent
Yang et al.

(10) Patent No.: US 10,320,194 B2
(45) Date of Patent: Jun. 11, 2019

(54) CONTROL FEEDBACK LOOP DESIGN WITH FAST TRANSIENT RESPONSE FOR MULTI-LEVEL CONVERTER

(71) Applicant: Apple Inc., Cupertino, CA (US)

(72) Inventors: Zaohong Yang, Plano, TX (US);
Bogdan T. Bucheru, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/850,752

(22) Filed: Dec. 21, 2017

(65) Prior Publication Data

US 2019/0074692 A1    Mar. 7, 2019

Related U.S. Application Data

(60) Provisional application No. 62/553,598, filed on Sep. 1, 2017.

(51) Int. Cl.
| | |
|---|---|
| *H02M 3/335* | (2006.01) |
| *H02J 3/18* | (2006.01) |
| *H02M 1/14* | (2006.01) |
| *H02J 3/36* | (2006.01) |
| *H02M 1/42* | (2007.01) |

(52) U.S. Cl.
CPC .............. *H02J 3/1857* (2013.01); *H02J 3/36* (2013.01); *H02M 1/14* (2013.01); *H02M 1/42* (2013.01); *H02M 3/33538* (2013.01); *H02M 3/33569* (2013.01)

(58) Field of Classification Search
CPC ...... H02M 1/14; H02M 1/42; H02M 3/33538; H02M 3/33569; H02J 3/1857; H02J 3/36
See application file for complete search history.

(56) References Cited

U.S. PATENT DOCUMENTS

| | | | | |
|---|---|---|---|---|
| 2012/0154260 A1* | 6/2012 | Decraemer | ........ | H05B 33/0815 345/82 |
| 2014/0140107 A1* | 5/2014 | Chen | ................. | H02M 3/33523 363/21.15 |
| 2016/0094145 A1* | 3/2016 | Oh | .................... | H02M 3/33523 363/89 |

OTHER PUBLICATIONS

"150 W AIO Power Supply Using HiperPFS-3 PFS7526H and LinkSwitch-HP LNK6779EG without Standby Converter", Applications Engineering Department, Power Integrations, Sep. 21, 2016.*

* cited by examiner

*Primary Examiner* — Jue Zhang
*Assistant Examiner* — Jye-June Lee
(74) *Attorney, Agent, or Firm* — Blank Rome LLP

(57) ABSTRACT

Disclosed herein are a system, method and non-transitory program storage device that are intended to provide a control system with quick response for a multi-level power converter. The control system may regulate an output voltage of the power converter based on one or more feedback signals. The feedback signals may be generated based on a differential between the output voltage and a reference voltage. The control system may further include one or more feed-forward signals representative of either the output voltage or transients of the output voltage. The control system may further include one or more switches in parallel with the one or more capacitors to selectively enable and/or disable direct feed-forward and capacitive feed-forward responsive to the output voltage at different levels.

13 Claims, 5 Drawing Sheets

CONTROL FEEDBACK LOOP DESIGN WITH FAST TRANSIENT RESPONSE FOR MULTI-LEVEL CONVERTER

TECHNICAL FIELD

This disclosure relates generally to the field of power converters and, in particular, to the design of control systems for multi-level converters.

BACKGROUND

In some applications, it is desirable for power converters to have a capability of supplying multi-level output voltages to electronic devices of different ratings. For example, the evolving Universal Serial Bus Power Delivery (USB PD) Standard prefers power supplies to provide supply voltages of, for example, 5V, 9V, 12V, 15V and/or 20V. Request for such diverse voltage levels may pose challenges to the design of power converters, especially with respect to the stability of power converters over a wide operating range. Commercially available components used in the control system of a power converter for one or more voltage levels (e.g., low voltages) may not be usable and/or available any more for other voltage levels (e.g., high voltages). For example, power supplies may typically employ one or more shunt regulators to implement closed loop control. A popular shunt regulator such as a 1.24V TLVH431 may fit a power supply of low voltage level(s) (e.g., 5V, 9V and/or 15V), but may not operate properly at high voltage level(s) (e.g., 20V) because of the shunt regulator's limited voltage rating. Conversely, a shunt regulator such as a 2.5V TL431 may fulfill the requirement of high voltage level(s) (e.g. 20V) because the TL431 regulator may withstand high voltage(s) up to 36V, but may not work reliably under low voltage(s) (e.g., 5V) because of instability issues. Therefore, what is needed is a design of control system to fulfill both performance and commercial requirements of multi-level power converters.

SUMMARY

Disclosed herein are a system, method and non-transitory program storage device that are intended to provide a control system with quick response for a multi-level power converter. In some embodiments, the control system may regulate an output voltage of the power converter based on one or more feedback signals. The feedback signals may be generated by, for example, a shunt regulator based on a differential between the output voltage and a reference voltage.

In some embodiments, the control system may include one or more feed-forward signals. The feed-forward signals may represent a control path directly from the output voltage (hereinafter referred to as "direct feed-forward") and may be generated, for example, via an optocoupler. The use of feed-forward in the control system may shorten a response time of the power converter and thus improve its performance under transients.

In some embodiments, the feed-forward signals may be provided to the optocoupler through one or more capacitors (hereinafter referred to as "capacitive feed-forward). The capacitors may function as one or more high-pass filters, thus isolating (i.e., blocking) a high direct current (DC) voltage (such as a high output voltage) from, but still passing transient signal(s) to, the optocoupler and shunt regulator.

In some embodiments, the control system may include one or more switches coupled in parallel with the one or more capacitors. The switches may be used to selectively enable and/or disable direct feed-forward and capacitive feed-forward responsive to levels of the output voltage.

In some embodiments, the control system may further include a bias circuit that may be configured to supply a bias current to the shunt regulator, which may ensure the shunt regulator's operation in an appropriate range and thus enhance its stability.

BRIEF DESCRIPTION OF THE DRAWINGS

Various embodiments of the disclosed concepts are illustrated by way of example and not by way of limitation in the accompanying drawings in which like references indicate similar elements. It should be noted that references to "an", "one" or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. Additionally, features from multiple figures may be combined into some embodiments.

DETAILED DESCRIPTION

In the following description, for purposes of explanation, numerous specific details are set forth to provide a thorough understanding of the disclosed concepts. As part of this description, some of this disclosure's drawings represent structures and devices in block diagram form to avoid obscuring the disclosure. In the interest of clarity, not all features of an actual implementation are described in this disclosure. Moreover, the language used in this disclosure has been principally selected for readability and instructional purposes, and may not have been selected to delineate or circumscribe the disclosed subject matter, resort to the claims being necessary to determine such disclosed subject matter.

Figure 1:
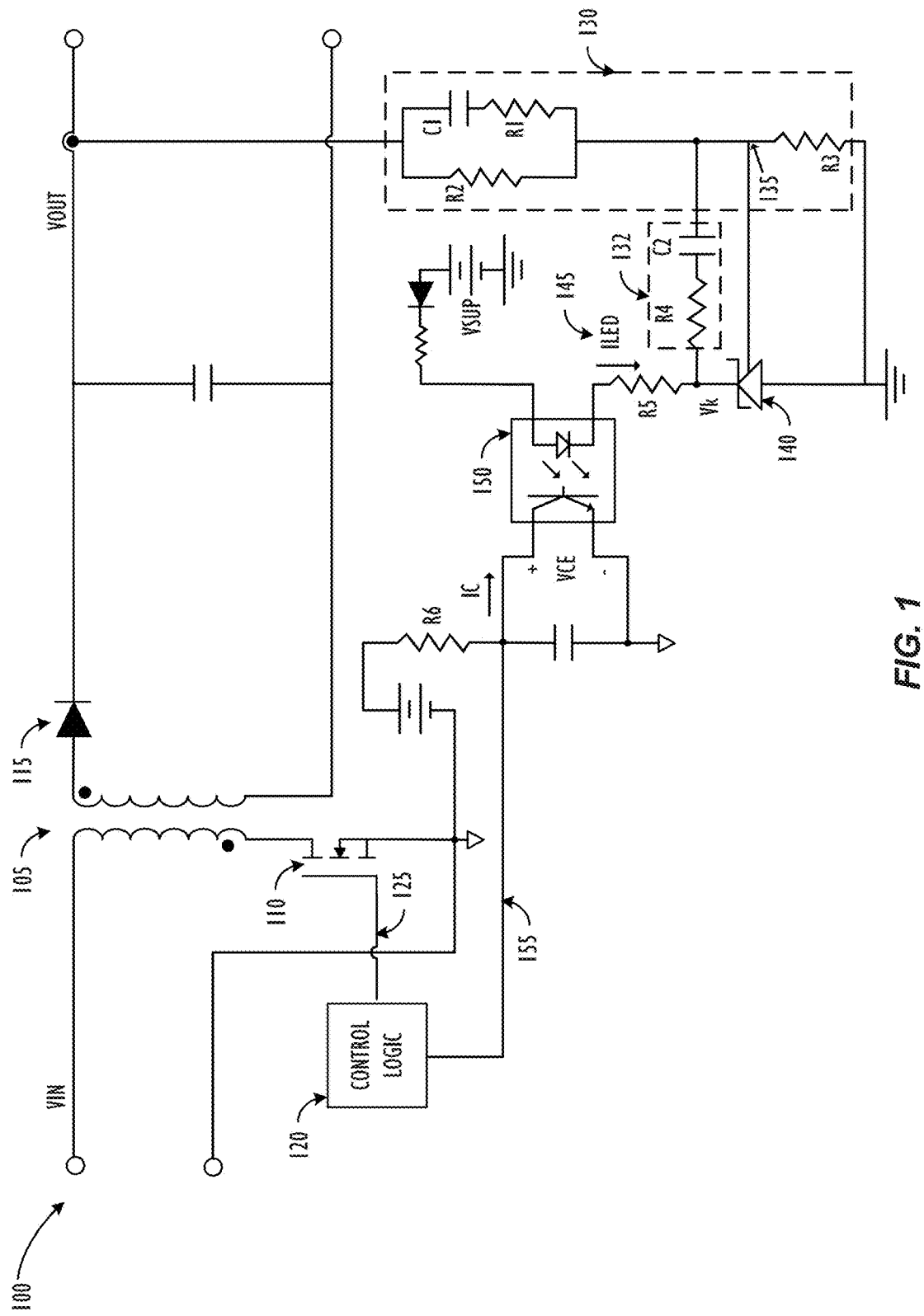
FIG. 1 is a schematic diagram illustrating an exemplary converter without feed-forward.

FIG. 1 is a schematic diagram illustrating converter 100. As shown in FIG. 1, converter 100 may include transformer 105, switch 110 and rectifier 115, wherein switch 110 and rectifier 115 may be coupled in series with primary and secondary windings of transformer 105 respectively. Converter 100 may use control logic 120 to produce control signal 125 for switch 110, converting an input voltage $V_{IN}$ to an output voltage $V_{OUT}$. Converter 100, as shown in FIG. 1, may comprise a closed loop control system. For example, converter may include sensing circuit 130, including resistors R1/R2/R3 and capacitor C1 that, together, may provide voltage dividing, filtering and/or compensation. The voltage at node 135 may be fed to shunt regulator 140 (e.g., TLV431), which may in turn produce voltage $V_k$ at a cathode of shunt regulator 140 according to equation (1):

$$V_k = -\frac{Z_1}{Z_2} \times V_{OUT} \qquad (1)$$

where $V_{OUT}$ represents the output voltage of flyback converter 100, $V_k$ is the cathode voltage of shunt regulator 140, $Z_1$ is an alternating current (AC) impedance of network 132 (including, e.g., resistor R4 and capacitor C2), and $Z_2$ is an AC impedance of network 130 (including, e.g., resistors R1/R2 and capacitor C1). Since the following descriptions of FIG. 1 may focus on primarily transient analysis, only the AC components of networks 130/132's impedances are considered here. Further, network 132 may function as a compensation network to improve the gain and/or phase margins for a closed loop control system of converter 100.

Still referring to FIG. 1, converter 100 may also include optocoupler 150, which may be coupled between a supply voltage $V_{SUP}$ and shunt regulator 140. Optocoupler 150 may include a light-emitting diode (LED) at input and a phototransistor at output. Current $I_{LED}$ 145 may flow through the LED and generate light. The light may be applied to the phototransistor and generate, typically proportionally, a collector current $I_C$ that, in turn, may adjust a collector-to-emitter voltage $V_{CE}$ across the collector (or "C") and emitter (or "E") of the phototransistor. Converter 100 may further include a supply voltage $V_{SUP}$ that may provide a bias voltage for optocoupler 150 and shunt regulator 140. When the supply voltage $V_{SUP}$ is chosen to be a constant DC voltage, the AC component of $V_{SUP}$ may be treated as a zero voltage. Therefore, in an AC small signal analysis for transients of converter 100, current $I_{LED}$ 145 of optocoupler 150 may be determined according to equation (2), with reference to equation (1):

$$I_{LED} = -\frac{V_k}{R_5} = \frac{Z_1}{Z_2} \times \frac{V_{OUT}}{R_5} \qquad (2)$$

where R5 is the resistance of resistor R5 shown in FIG. 1. Note that a conduction voltage drop of LED diode of optocoupler 250 may be a small value and thus ignored in equation (2). As aforementioned, the collector current $I_C$ of the phototransistor of optocoupler 150 may be determined by current $I_{LED}$ 145, typically proportionally with a current transfer ratio (CTR):

$$I_C = CTR \times I_{LED} = CTR \times \frac{Z_1}{Z_2} \times \frac{V_{OUT}}{R_5} \qquad (3)$$

In an AC small signal analysis, the AC component of collector-to-emitter voltage $V_{CE}$ of optocoupler 150 may then be determined as:

$$V_{CE} = -I_C \times R_6 = -CTR \times \frac{R_6}{R_5} \times \left(\frac{Z_1}{Z_2} \times V_{OUT}\right) \qquad (4)$$

where R6 is the resistance of resistor R6 shown in FIG. 1. The collector-to-emitter voltage $V_{CE}$ may be fed to control logic 120 as command signal 155 to produce control signal 125. For example, command signal 155 may be sent to a non-inverting input of control logic 120 to set a threshold during which control signal 125 may become active for switch 110 to conduct currents, which essentially determines a switching duty cycle for switch 110.

During a transient of converter 100, for example, when the output voltage $V_{OUT}$ decreases, through networks 130 and 132, $V_{OUT}$ may lead to an increase of the cathode voltage $V_K$ of shunt regulator 140 according to equation (2). Consequently, the increment of $V_k$ may cause a decrease of collector current $I_C$ of optocoupler 150 according to equation (3), and an increase of command signal 155 according to equation (4). The increment of command signal 155 may lead to a longer conduction duration of switch 110, which, in turn, may transfer more energy from the primary winding of transfer 105 to the secondary winding and thus restore the output voltage $V_{OUT}$. This performs an operation of a closed loop control with negative feedback. Note that, in converter 100, the supply voltage $V_{SUP}$ may be a constant voltage that does not vary with $V_{OUT}$. Thus, transients of $V_{OUT}$ may have to pass through networks 130 and 132 in order to be reflected in command signal 155. This may cause delays that may slow down the response time of the closed loop control system. Note that FIG. 1 depicts switch 110 as a field-effect transistor (FET) merely for purposes of illustration only. As an alternative to FET, converter 100 may use other types of semiconductor devices deemed appropriate, e.g., metal-oxide-semiconductor FET (MOSFET), insulated gate bipolar transistor (IGBT), Gallium Nitride FET (GaN), etc. Similarly, rectifier 115 may be a diode or a switch such as FET, MOSFET, IGBT, GaN, etc. to rectify the secondary winding voltage of transformer 105.

Figure 2:
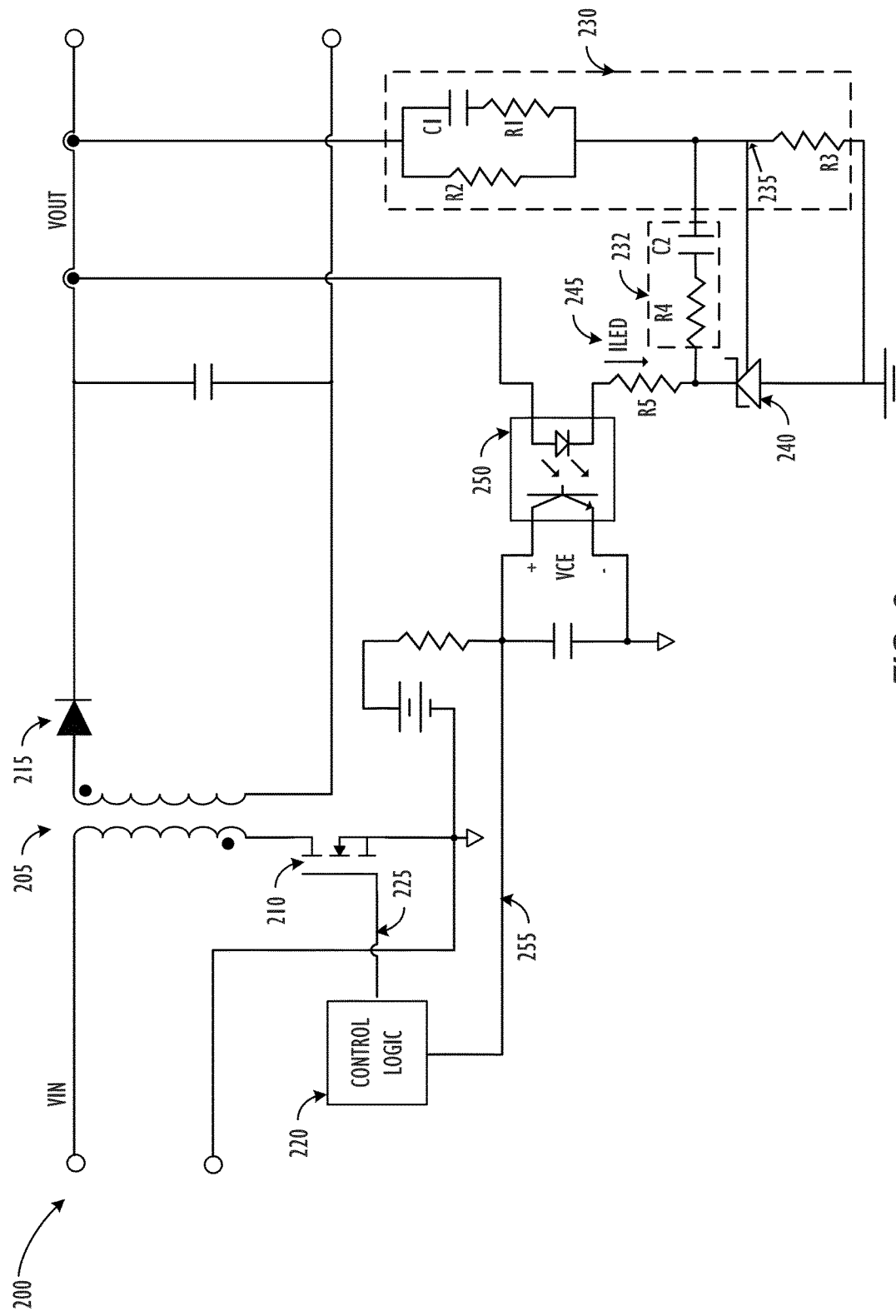
FIG. 2 is a schematic diagram illustrating an exemplary converter with direct feed-forward.

FIG. 2 shows a schematic diagram illustrating converter 200 that may include direct feed-forward. As shown in FIG. 2, converter 200 may include transformer 205, switch 210 and rectifier 215, wherein switch 210 and rectifier 215 may be coupled in series with primary and secondary windings of transformer 205 respectively. Converter 200 may use control logic 220 to produce control signal 225 for switch 210, converting an input voltage $V_{IN}$ to an output voltage $V_{OUT}$. Converter 200 may also include sensing circuit 230 (e.g., including resistors R1/R2/R3 and capacitor C1) and shunt regulator 240 (e.g., TLV 431), which may operate in substantially the same way as sensing circuit 130 and shunt regulator 140 in FIG. 1. Note that converter 200 may employ resistors R4 and C2 to form an optional compensation network 232 to improve the gain and/or phase margins of converter 200, similar to network 132 described in FIG. 1.

Still referring to FIG. 2, converter 200 may also include optocoupler 250, which may be coupled between converter 200's output terminal and shunt regulator 240. Optocoupler 250 may include an LED at input and a phototransistor at output. Current $I_{LED}$ 245 may flow through the LED and generates light. The light may be applied to the phototransistor and generate a proportional collector current that, in turn, may adjust a collector-to-emitter voltage $V_{CE}$ across the phototransistor's collector (or "C") and emitter (or "E"). The collector-to-emitter voltage VCE may be sent to control logic 220 as command signal 255 to produce control signal 225. Note that, unlike FIG. 1, the LED of optocoupler 250 may be coupled to the output terminal of converter 200 rather than a supply voltage $V_{SUP}$ and thus provide a feed-forward configuration.

Current $I_{LED}$ 245 may be determined based on a differential voltage across the LED according to equation (5):

$$I_{LED} = \frac{V_{OUT} - V_k}{R_5} = \frac{V_{OUT} - \left(-\frac{Z_1}{Z_2} \times V_{OUT}\right)}{R_5} = \frac{V_{OUT}}{R_5} + \frac{\frac{Z_1}{Z_2} \times V_{OUT}}{R_5} \qquad (5)$$

where $V_{OUT}$ represents the output voltage of converter 200, $R_5$ is a resistance of resistor R5, Z1 is an AC impedance of network 230, and Z2 is an AC impedance of network 232. Note that a conduction voltage drop of LED diode of optocoupler 250 is ignored here in equation (5). However, when the value of output voltage VOUT is low, the impact of the conduction voltage drop may become more significant, and the conduction voltage drop may have to be taken into account. Again, since the following descriptions of FIG. 2 may focus on primarily transient analysis, only the AC components of network 230/232's impedances are considered herein. By comparing equations (2) and (5), it may be noted that besides the feedback signal as shown in equation (2), equation (5) may further include a feed-forward signal represented by the output voltage $V_{OUT}$. Since the feed-forward signal is provided to optocoupler 250 from the output voltage $V_{OUT}$, the feed-forward signal may represent the output voltage $V_{OUT}$ of converter 200 and thus may be treated as direct feed-forward. As current $I_{LED}$ includes both feedback and feed-forward elements, the collector-to-emitter voltage $V_{CE}$ and ultimately control signal 225 may also comprise feedback and feed-forward signals based on the output voltage $V_{OUT}$. With reference to the descriptions of FIG. 1, during an output transient, for example, when the output voltage $V_{OUT}$ of converter 100 decreases, this $V_{OUT}$ transient may be directly fed to optocoupler 250 through input LED because of the feed-forward configuration. As a result, the output collector current $I_C$ of optocoupler 250 may immediately decrease. On top of it, the feedback signal may also cause a decrease of collector current $I_C$ through networks 230/232 and shunt regulator 240, in a similar manner as described in FIG. 1. Consequently, command signal 255 may increase. The increment of command signal 255 may in turn lead to an increased conduction duration for switch 210, which may result in a recovery of output voltage $V_{OUT}$. Compared to FIG. 1, the feed-forward mechanism, on top of the feedback, may reduce delays of the closed loop control system of converter 200 and provide a faster transient response than converter 100.

As converter 200 is adapted to provide multi-level output voltages $V_{OUT}$, commercially available components, such as shunt regulator 240, may not fit the wide operating range of converter 200. For example, a shunt regulator TLVH431 with 1.25V internal reference voltage $V_{REF}$ may be rated for a maximum voltage of 18V. The 1.25V shunt regulator TLVH431 may not operate under 20V output voltage. Alternatively, a shunt regulator TL431 with 2.5V internal reference voltage $V_{REF}$ may have a maximum voltage rating of 36V and fit the 20V output voltage. However, the 2.5V shunt regulator TL431 may not be desired or even feasible for 5V output voltage because of instability issues. For example, with the feed-forward configuration, when the output voltage $V_{OUT}$ is a low voltage, e.g., 5V, current $I_{LED}$ 245 of optocoupler 240 may not be sufficient to provide a meaningful regulation of $V_{OUT}$ because the differential voltage across resistor $R_5$, as shown in equation (5), may be too small, considering the further LED conduction voltage drop of optocoupler 240 and required minimum operating voltage of shunt regulator 240.

Figure 3:
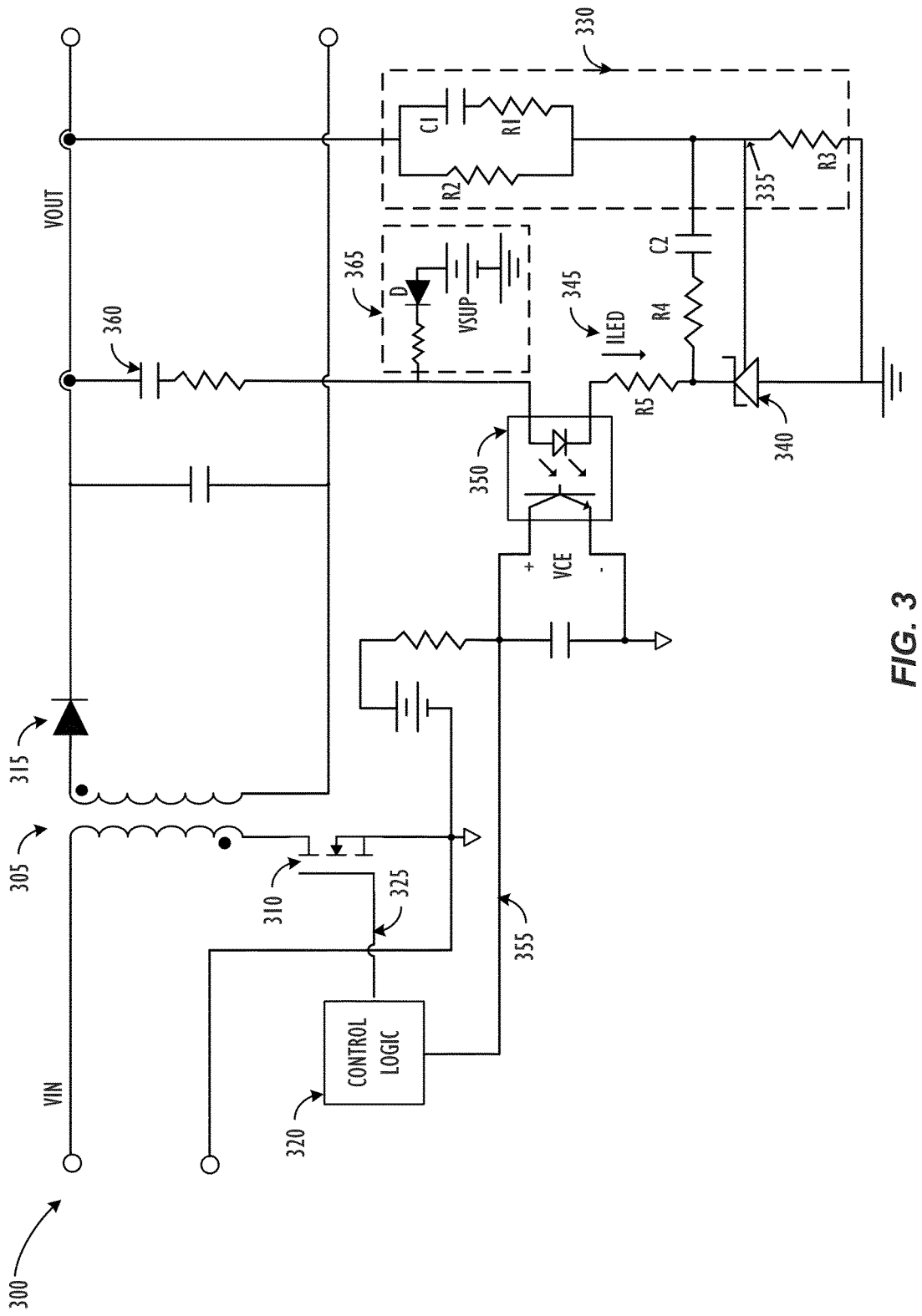
FIG. 3 is a schematic diagram illustrating an exemplary converter with capacitive feed-forward and bias circuit.

To address those restraints, FIG. 3 shows a schematic diagram of converter 300 with capacitive feed-forward and bias circuit. As shown in FIG. 3, converter 300 may include transformer 305, switch 310 and rectifier 315, wherein switch 310 and rectifier 315 may be coupled in series with primary and secondary windings of transformer 305 respectively. Converter 300 may use control logic 320 to produce control signal 325 for switch 310, converting an input voltage $V_{IN}$ to an output voltage $V_{OUT}$. Converter 300 may also include sensing circuit 330 (e.g., including resistors R1/R2/R3 and capacitor C1) and shunt regulator 340 (e.g., TLV 431), which may operate in substantially the same way as sensing circuits 130/230 and shunt regulators 140/240 in FIGS. 1 and 2. Further, FIG. 3 may comprise optocoupler 350, operating in substantially the same way as optocoupler 250 in FIG. 2.

Additionally, converter 300 may include capacitor 360 and optional bias circuit 365 as shown in FIG. 3. In particular, capacitor 360 may be coupled between an output terminal of converter 300 to an input LED of optocoupler 350. Capacitor 360 may function as a high-pass filter, providing several capabilities. First, capacitor 360 may isolate (i.e., block) the DC output voltage $V_{OUT}$ from optocoupler 350 and shunt regulator 340. Thus, the above-mentioned low-voltage shunt regulator, e.g., 1.24V TLVH431, may now be used for high output voltage(s) $V_{OUT}$ (e.g., 20V). Second, capacitor 360 may still pass transient signal(s) created by, for example, load variations to optocoupler 350 and shunt regulator 340, thus providing a feed-forward signal to the control system of converter 300. Because the feed-forward signal is provided through capacitor 360, the feed-forward signal may not directly represent the output voltage $V_{OUT}$ of converter 300 but rather $V_{OUT}$'s transients. Thus, the feed-forward signal may be thought of as capacitive feed-forward so as to be distinguished from the direct feed-forward in FIG. 2.

Diode D and voltage supply $V_{SUP}$ may form an optional bias circuit 365. Bias circuit 365 may be coupled to shunt regulator 340, for example, through optocoupler 350. Bias circuit 365 may produce a bias current and/or voltage to shunt regulator 340. For certain types of shunt regulator 340, it may ensure the shunt regulator's operation in the appropriate range and thus enhance its stability. The voltage supply $V_{SUP}$ may be powered from converter 300's input and/or output voltage ($V_{IN}$ and/or $V_{OUT}$) or a separate power source.

Figure 4:
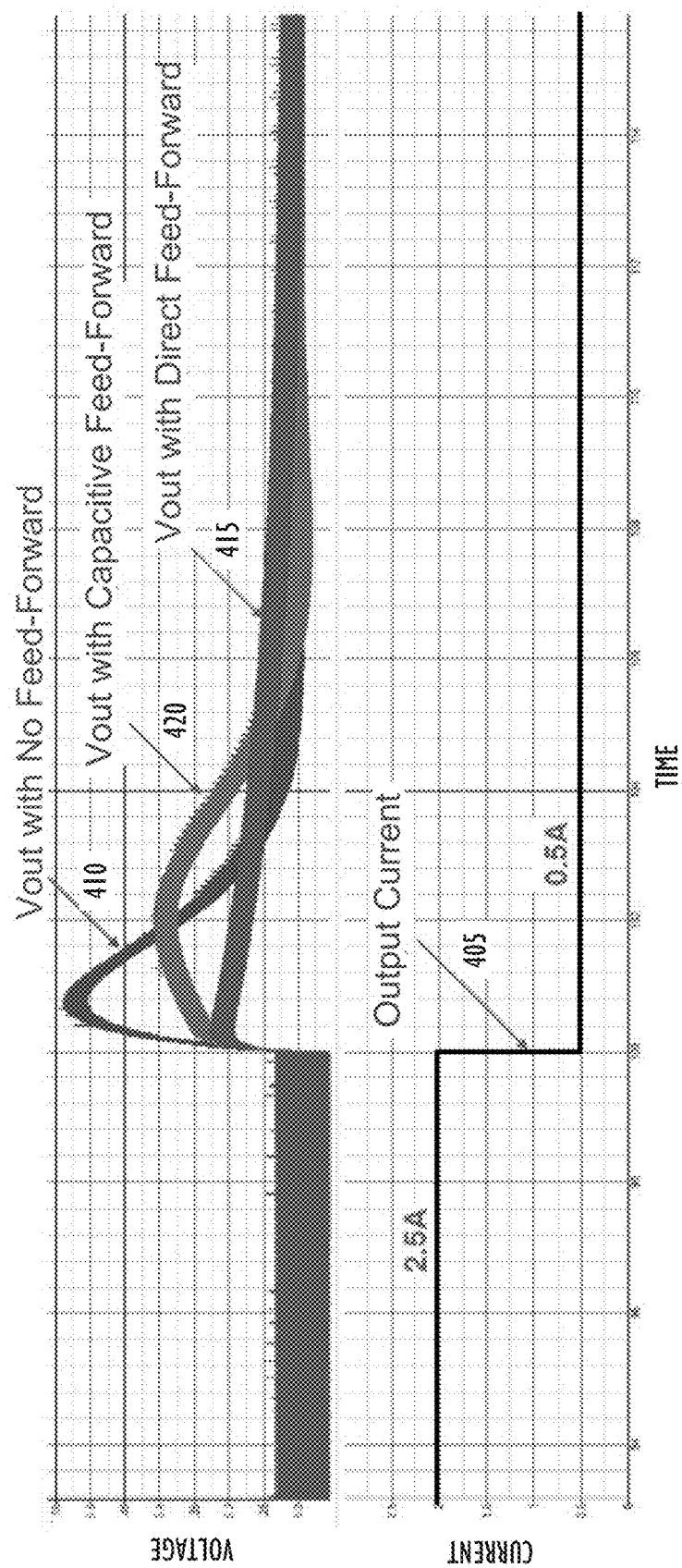
FIG. 4 are waveforms illustrating performance of the different exemplary converters.

FIG. 4 depicts exemplary waveforms illustrating performance of converters 100/200/300. In FIG. 4, the horizontal axis may represent time in milliseconds (ms), while the top and bottom vertical axes may represent voltage and current respectively. As shown in FIG. 4, around 100 ms, the converters may have a load reduction, shown by a change in waveform 405 of output current from 2.5 A to 0.5 A. Waveforms 410/415/420 represent the respective output voltage $V_{OUT}$ of converter 100/200/300. As shown in FIG. 4, among the three converters, waveform 410 of converter 100 (without feed-forward) may produce a maximum voltage over-shoot, waveform 415 of converter 200 (with direct feed-forward) may have a minimum voltage over-shoot, and waveform 420 of converter 300 (with capacitive feed-forward) may include an intermediate voltage over-shoot. Thus, converter 200 may produce better transient performance than converter 300, which, in turn, may behave better than converter 100.

Figure 5:
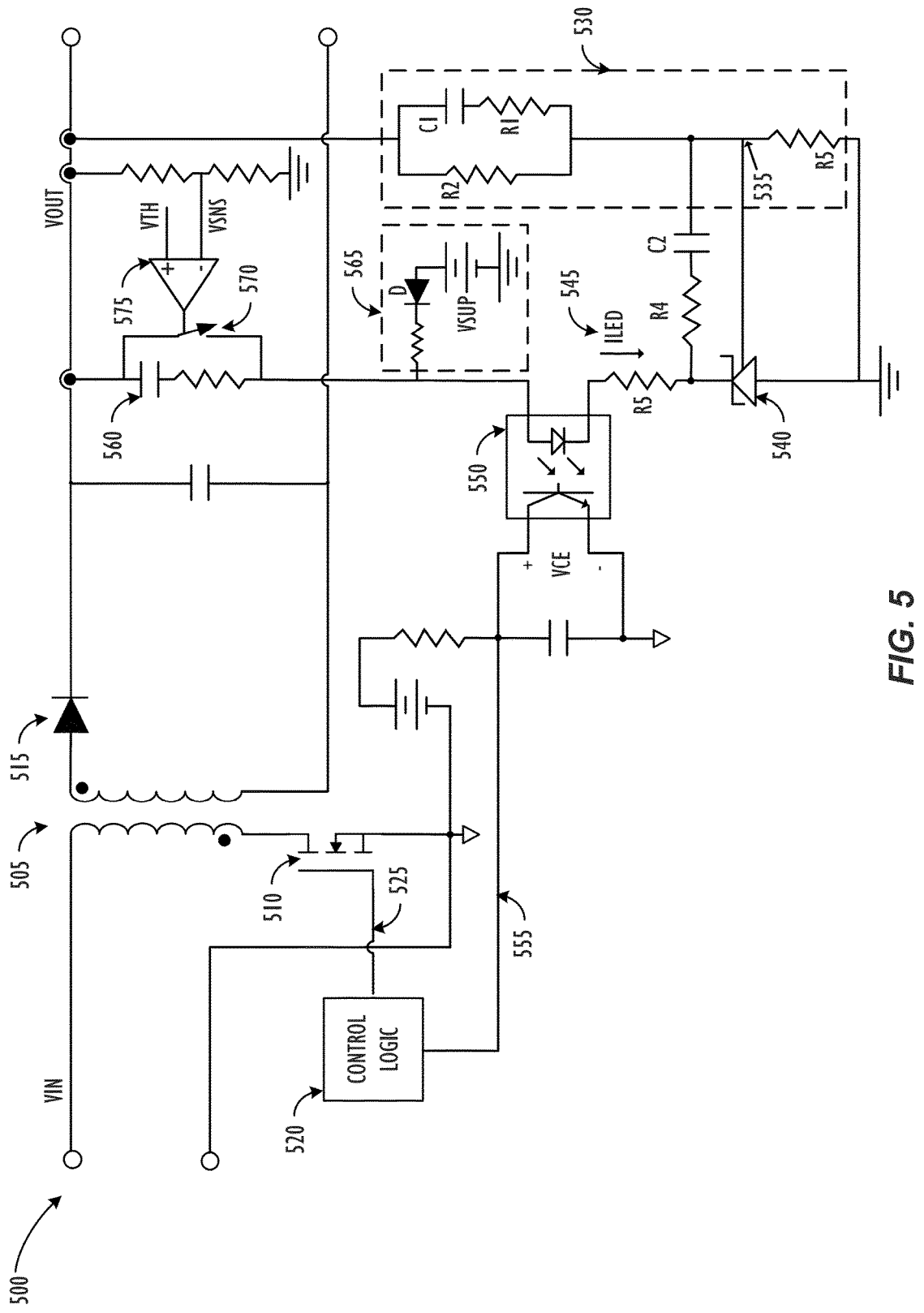
FIG. 5 is a schematic diagram illustrating an exemplary converter with a selective circuit between direct feed-forward and capacitive feed-forward.

To combine the benefits of both direct and capacitive feed-forward, FIG. 5 illustrates converter 500 with a selective circuit of direct feed-forward and capacitive feed-forward. Converter 500 may employ a substantially similar configuration as converter 300 in FIG. 3. However, converter 500 may include an additional switching circuit that may selectively enable and/or disable direct feed-forward and capacitive feed-forward. For example, converter 500 may include transformer 505, switch 510 and rectifier 515, wherein switch 510 and rectifier 515 may be coupled in series with primary and secondary windings of transformer 505 respectively. Converter 500 may use control logic 520 to produce control signal 525 for switch 510, converting an input voltage $V_{IN}$ to an output voltage $V_{OUT}$.

Converter 500 may include sensing circuit 530 (e.g., including resistors R1/R2/R3 and capacitor C1) and shunt regulator 540 (e.g., TLV 431), which may operate in substantially the same way as sensing circuits 130/230/330 and shunt regulators 140/240/340 in FIGS. 1-3. Further, FIG. 5 may comprise shunt regulator 540, optocoupler 550 and optional bias circuit 565, which may operate in substantially the same way as shunt regulator 140/240/340, optocoupler 250/350 and bias circuit 365 as described in FIGS. 1-3.

Converter 500 may further have parallel-connected capacitor 560 and switch 570, both of which may be coupled between an output terminal of converter 500 and an input LED of optocoupler 550. When switch 570 is closed, switch 570 may bypass capacitor 560 and thus provide direct feed-forward to optocoupler 550, as converter 200 in FIG. 2. Conversely, when switch 570 is open, capacitor 560 may be in series with optocoupler 550 (or in the feed-forward path) and thus produce capacitive feed-forward to optocoupler 550. Thus, by controlling switch 570, converter 500 may selectively enable and/or disable direct feed-forward and capacitive feed-forward.

Switch 570 may be controlled based on the output voltage $V_{OUT}$ of converter 500. For example, the control signal of switch 570 may be created by comparator 575 responsive to a differential between signal $V_{SNS}$ (a measurement of the output voltage $V_{OUT}$) and threshold $V_{TH}$. The threshold $V_{TH}$ may then be selected appropriately to enable and/or disable direct and capacitive feed-forward according to converter 500's output voltage levels. For example, threshold $V_{TH}$ may be set to 6V, and comparator 575 may close switch 570 when the output voltage $V_{OUT}$ is lower than 6V (e.g., 5V) and enable direct feed-forward (and disable capacitive feed-forward). Meanwhile, when the output voltage $V_{OUT}$ becomes larger than 6V (e.g., 9/12/15/20V), comparator 575 may open switch 570 and enable capacitive feed-forward (and disable direct feed-forward). Note that threshold $V_{TH}$ may be predetermined or adjustable during operation.

The disclosure uses several numerical values in the descriptions of above embodiments. However, it should be understood that these numerical values are for purposes of illustration only, and that other voltages, currents, component ratings, timings, etc. may be used. Also, note that the disclosed feedback, direct feed-forward and/or capacitive feed-forward for the design of control systems may apply to other types of power converters besides the exemplary converters, for example, non-isolating buck, boost or buck-boost converters, forward converters, push-pull converters, half-bridge or full-bridge converters, etc.

The various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A multi-output voltage power converter control system comprising:
    a shunt regulator configured to provide a feedback signal representative of a differential between an output voltage of the power converter and a reference voltage; and
    an optocoupler configured to receive the feedback signal and provide a command signal based on the feedback signal and a feed-forward signal;
    a capacitor and switch coupled to the optocoupler, the shunt regulator, and the output voltage of the power converter so as to selectively provide one of:
        a direct feed-forward signal representative of the output voltage of the power converter; and
        a capacitive feed-forward signal representative of output voltage transients to the optocoupler; and
    control logic configured to receive the command signal and provide a control signal for the power converter based on the command signal.

2. The multi-output voltage power converter control system of claim 1, wherein the optocoupler and shunt regulator are coupled in series to an output terminal of the power converter.

3. The multi-output voltage power converter control system of claim 1, wherein the switch is configured to selectively enable and disable the direct feed-forward and capacitive feed-forward signals responsive to the output voltage at different levels.

4. The multi-output voltage power converter control system of claim 1, further comprising a bias circuit coupled to the shunt regulator and configured to provide a bias current to the shunt regulator.

5. A method to control a multi-output voltage power converter, comprising:
    providing a feedback signal by a shunt regulator representative of a differential between an output voltage of the power converter and a reference voltage;
    providing the feedback signal and a feed-forward signal to an optocoupler to generate a command signal, wherein the feed-forward signal is representative of the output voltage of the power converter, wherein the feed-forward signal is selectively one of:
        a direct feed-forward signal representative of the output voltage of the power converter; and
        a capacitive feed-forward signal representative of transients of the output voltage of the power converter; and
    providing the command signal to control logic to generate a control signal for the power converter to regulate the output voltage.

6. The method of claim 5, wherein the optocoupler and shunt regulator are coupled in series to an output terminal of the power converter.

7. The method of claim 5, further comprising selectively enabling and disabling the direct feed-forward and capacitive feed-forward signals responsive to the output voltage at different levels using a switch in parallel with the capacitor.

8. The method of claim 5, further comprising providing a bias current to the shunt regulator using a bias circuit.

9. A multi-output voltage power converter, comprising:
    a power conversion circuit including one or more switches configured to regulate an input voltage to an output voltage;
    a shunt regulator configured to provide a feedback signal representative of a differential between the output voltage and a reference voltage;
    an optocoupler configured to receive the feedback signal and provide a command signal based on the feedback signal and a feed-forward signal, wherein the feed forward signal is selectively one of:
        a direct feed-forward signal representative of the output voltage of the power converter; and
        a capacitive feed-forward signal representative of transients of the output voltage to the optocoupler; and control logic configured to receive the command signal and provide a control signal for the one or more switches based on the command signal.

10. The multi-output voltage power converter of claim 9, wherein the optocoupler and shunt regulator are coupled in series to an output terminal of the power converter.

11. The multi-output voltage power converter of claim 9, further comprising a switch coupled in parallel with a capacitor.

12. The multi-output voltage power converter of claim 11, wherein the switch is configured to selectively enable and disable the direct feed-forward and capacitive feed-forward signals responsive to the output voltage at different levels.

13. The multi-output voltage power converter of claim 9, further comprising a bias circuit coupled to the shunt regulator and configured to provide a bias current to the shunt regulator.

* * * * *

UNITED STATES PATENT AND TRADEMARK OFFICE
CERTIFICATE OF CORRECTION

PATENT NO. : 10,320,194 B2
APPLICATION NO. : 15/850752
DATED : June 11, 2019
INVENTOR(S) : Zaohong Yang et al.

Page 1 of 1

It is certified that error appears in the above-identified patent and that said Letters Patent is hereby corrected as shown below:

In the Specification

Column 5 Line 54: replace the phrase "optocoupler 240" with the phrase --optocoupler 250--;

Column 5 Line 58: replace the phrase "optocoupler 240" with the phrase --optocoupler 250--;

In the Claims

Column 8 Line 50: In Claim 7: replace the phrase "the capacitor" with the phrase --a capacitor--.

Signed and Sealed this
Twenty-seventh Day of August, 2019

Andrei Iancu
*Director of the United States Patent and Trademark Office*